(12) United States Patent
Haustein et al.

(10) Patent No.: US 9,563,858 B2
(45) Date of Patent: Feb. 7, 2017

(54) AUTOMATED SETUP OF PRESENTATION EVENT AGENDA AND LOGISTICS

(75) Inventors: Nils Haustein, Soergenloch (DE); Thorsten Krause, Mainz (DE); Michael Maurus, Mainz (DE); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 789 days.

(21) Appl. No.: 13/171,651

(22) Filed: Jun. 29, 2011

(65) Prior Publication Data
US 2013/0006695 A1   Jan. 3, 2013

(51) Int. Cl.
G06Q 10/00 (2012.01)
G06Q 10/02 (2012.01)
G06Q 10/10 (2012.01)

(52) U.S. Cl.
CPC .......... *G06Q 10/02* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 7,620,896 B2* | 11/2009 | Miller et al. | 715/730 |
| 2002/0103695 A1* | 8/2002 | Urken et al. | 705/12 |
| 2003/0172020 A1* | 9/2003 | Davies et al. | 705/36 |
| 2003/0233274 A1* | 12/2003 | Urken et al. | 705/12 |
| 2005/0067493 A1* | 3/2005 | Urken | 235/386 |
| 2005/0223314 A1* | 10/2005 | Varadarajan et al. | 715/512 |
| 2006/0085449 A1* | 4/2006 | Sattler et al. | 707/100 |
| 2006/0224430 A1* | 10/2006 | Butt | 705/8 |
| 2007/0005408 A1* | 1/2007 | Boss et al. | 705/8 |

(Continued)

OTHER PUBLICATIONS

Waibel, A.; Schultz, T.; Bett, M.; Denecke, M.; Malkin, R.; Rogina, I.; Stiefelhagen, R.; Jie Yang; , "SMaRT: the Smart Meeting Room Task at ISL," Acoustics, Speech, and Signal Processing, 2003. Proceedings. (ICASSP '03). 2003 IEEE International Conference on , vol. 4, No., pp. IV-752-5 vol. 4, Apr. 6-10, 2003.*

(Continued)

*Primary Examiner* — Gurkanwaljit Singh
(74) *Attorney, Agent, or Firm* — Patents on Demand P.A.; Brian K. Buchheit; Scott M. Garrett

(57) ABSTRACT

An artifact repository can be queried for a set of different pre-existing presentation artifacts based on requirements and constraints of a presentation event to produce a query result. The query result can comprise a set of presentation artifacts suitable for satisfying at least a portion of the requirements and constraints. The querying can match the artifact specific metadata against the requirements and constraints to produce the query result. An agenda comprising a set of different agenda items can be automatically constructed utilizing the query result. Each of the different agenda items can occupy a time slot of the presentation event. Creation of agenda items can be a non-manual effort automatically determined by a computing device in a data driven manner given the requirements, the constraints, and the pre-existing presentation artifacts of the artifact repository. Resources for the different agenda items can be automatically booked.

25 Claims, 4 Drawing Sheets

(56) References Cited

U.S. PATENT DOCUMENTS

2007/0016661 A1* 1/2007 Malik .................... 709/223
2007/0265902 A1* 11/2007 Brennen et al. ............ 705/8
2007/0288278 A1* 12/2007 Alexander et al. .......... 705/8
2008/0040340 A1* 2/2008 Varadarajan et al. ........ 707/5

OTHER PUBLICATIONS

Berna Erol, "Linking multimedia presentations with their symbolic source documents: algoritm and applications" Proceeding Multimedia '03 Proceedings of the eleventh ACM international conference on Multimedia pp. 498-507.*

Lisa Purvis, Steven Harrington, Barry O'Sullivan, and Eugene C. Freuder. 2003. Creating personalized documents: an optimization approach. In Proceedings of the 2003 ACM symposium on Document engineering (DocEng '03). ACM, New York, NY, USA, 68-77.*

Hu Lidan, "An Intelligent Presentation System", Online Document: www.kth.se, Aug. 7, 2008, 96 pages.

* cited by examiner

Factors/Criteria 260

- Field / Topic
- Duration Range
- Date Range
- Location/Region Preference
- Target Audience
- Food/Drink
- Special Event(s)
- Budget Range
- Quality Level

Requirements/Constraints 265

- Room(s)
- Presentation(s)
- Presenter(s)
- Staff
- Equipment
- Proximate Attractions Artifact Table Sample A 270

| Topic | Subtopic | Presentation | Slides | Duration | Presenter |
|---|---|---|---|---|---|
| Tape | Overview | Tape.ppt | 1- 10 | 20 min | Nils |
| Tape | LTO | Tape.ppt | 11-25 | 30 min | Michael |
| Tape | Overview | Disk.ppt | 1- 20 | 40 min | Ulla |

Artifact Table Sample B 275

| File | Duration | Variance | Topic | Type | Size |
|---|---|---|---|---|---|
| PresA | 30mins | +/- 10min | TopicA | Slides_5 | 40 peop |
| PresB | 20mins | + 4min | TopicA | Movie Clip | 200 peop |
| PresC | 45mins | +/- 8min | TopicB | Discussion | 100 peop |

FIG. 2A

AUTOMATED SETUP OF PRESENTATION EVENT AGENDA AND LOGISTICS

BACKGROUND

The present invention relates to the field of software for managing presentation events.

A presentation event (e.g., conference) can be a gathering of a set of people, referred to as an audience, which observes a set of one or more presentations, each provided by a set of one or more presenters. The presentations can include slideshows, media presentations, round table discussions, demonstrations, and the like.

Each presentation event is typically organized by a central topic, where multiple specific presentations can be given on that topic. Thus, a presentation event is has a set of details, such as a date, time, location, one or more attendees, one or more presentations, and one or more presenters. Often the presentation details are initially proposed within a range, which is narrowed during the presentation event establishment process, until a solid agenda, specific locations and times, and the like are created. This agenda may vary slightly over time (i.e., substitute planners needed for cancellations, etc.). Numerous logistical concerns, such as catering for the event, printing materials (e.g., name tags, portfolios, signs), and the like must be handled. Traditionally, the event setup and logistics process has been a manually driven one, where success or failure of the event can be largely dependent on manual activities performed by a set of event planners.

FIG. 1 (Prior Art) provides an illustrative example of a conventional architecture 100, which demonstrates a manner in which a presentation event is currently planned and a manner in which logistics for the presentation event are handled. The architecture 100 assumes a presentation event where one or more presenters 112 provide presentations to an audience 104. These presentations can occur in a set of one or more rooms 110, halls, or other locations. Additionally, the presentation event can be supported by one or more service entities, such as catering entities 114. Logistics and set-up specifics for the presentation event can be managed and/or coordinated by a set of one or more event planners 106, in accordance with event request specifics provided by one or more requestors 102.

To elaborate, a requestor 102 of the presentation event can define event goals and topics, which target a particular audience 104. Specifics desired for the event can be communicated between the requestor 102 and the event planner(s) 106. In a real-world scenario, these communications often occurs as a series of exchanges with between one or more requestors 102 and planning agents (e.g., planners 106). Architecture 100 includes request message 120 as a simplistic representation of these exchanges and assumptions. A granularity level and comprehensiveness of the requests conveyed between the requestor 102 and planner(s) 106 can vary significantly from situation-to-situation. In one embodiment, event requests (represented by request message 120) can include, but are not limited to, a set of topics, start and end times and dates, a location, occupancy requirements, catering requirements, and accounting details, and the like, shown by data 121.

Event planners 106 develop an agenda for the presentation event, where the agenda defines a set of presentations to match the topics. Rooms, presenters 112, and supporting material are then determined on a presentation-by-presentation basis. For example, each of the presenters 112 must be contacted and booked. Presenters 112 can provide their own materials and/or can use pre-prepared materials that are provided to them. Presenter specific actions taken by the planners 106 are represented by actions 124 in architecture 100.

The planners 106 can also reserve a location, set of room(s) 110 and take other location-specific actions (providing a necessary quantity of chairs, audio/visual equipment, etc.) for the presentation event. These actions (e.g., booking actions 122) can consider an expected size of the audience 104, occupancy limitations of the rooms 110, costs, available dates/times, and other factors.

Additional actions can also be coordinated by planners 106. These actions (e.g., catering actions 126) include contracting with one or more service providers, such as catering entities 114. These catering entities 114 (and other service providers) can provide food, beverages, printed material, chairs (and other resources), audio visual equipment, rooms and travel arrangements for the presenters 112, and other miscellaneous services necessary for running or supporting the presentation event.

BRIEF SUMMARY

One embodiment of the disclosure is for a method for handling presentation events. In the method, an artifact repository can be queried for a set of different pre-existing presentation artifacts based on requirements and constraints of a presentation event to produce a query result. The query result can comprise a set of presentation artifacts suitable for satisfying at least a portion of the requirements and constraints. Each of the pre-existing artifacts comprises artifact specific metadata indicating at least an artifact topic and duration, and wherein the querying matches the artifact specific metadata against the requirements and constraints to produce the query result. An agenda comprising a set of different agenda items can be automatically constructed utilizing the query result. Each of the different agenda items can occupy a time slot of the presentation event. At least a portion of the different agenda items are for presentations to be given by a presenter. At least a portion of the pre-existing artifacts identified in the query result can comprise media to be presented to an audience by a presenter during a course of one of the presentations. Creation of agenda items can be a non-manual effort automatically determined by a computing device in a data driven manner given the requirements, the constraints, and the pre-existing presentation artifacts of the artifact repository. Resources for the different agenda items can be automatically booked. The resources can include presenters associated with the presentations and can include equipment and rooms needed for the presentations. Identification of needed resources and the booking of these resources can be a non-manual effort automatically performed by a computing device.

One aspect of the disclosure is for a system comprising an artifact repository, a fulfillment system, and a booking system. The artifact repository can be for a set of different pre-existing presentation artifacts. Each of the pre-existing artifacts can comprise artifact specific metadata indicating at least an artifact topic and duration. The presentation artifacts can comprise presentation files to be presented to an audience by a set of one or more presenters. The fulfillment system can query the artifact repository for a set of the different pre-existing presentation artifacts based on requirements and constraints of a presentation event to produce a query result. The fulfillment system can construct an agenda that comprises a set of different agenda items utilizing the query result. Each of the different agenda items can occupy a time slot of the presentation event. At least a portion of the different agenda items can be for presentations to be given by a presenter. Creation of agenda items can be a non-manual effort automatically determined by a computing device in a data driven manner given the requirements, the constraints, and the pre-existing presentation artifacts of the artifact repository. The booking system can book resources for the different agenda items. The resources can comprise presenters associated with the presentations and can comprise equipment and rooms needed for the presentations. Identification of needed resources and the booking of these resources can be a non-manual effort automatically performed by a computing device.

BRIEF DESCRIPTION OF THE SEVERAL VIEWS OF THE DRAWINGS

FIG. 2A illustrates sample data elements used for planning and logistics of a presentation event in accordance with an embodiment of the inventive arrangements disclosed herein.

DETAILED DESCRIPTION

Figure 1:
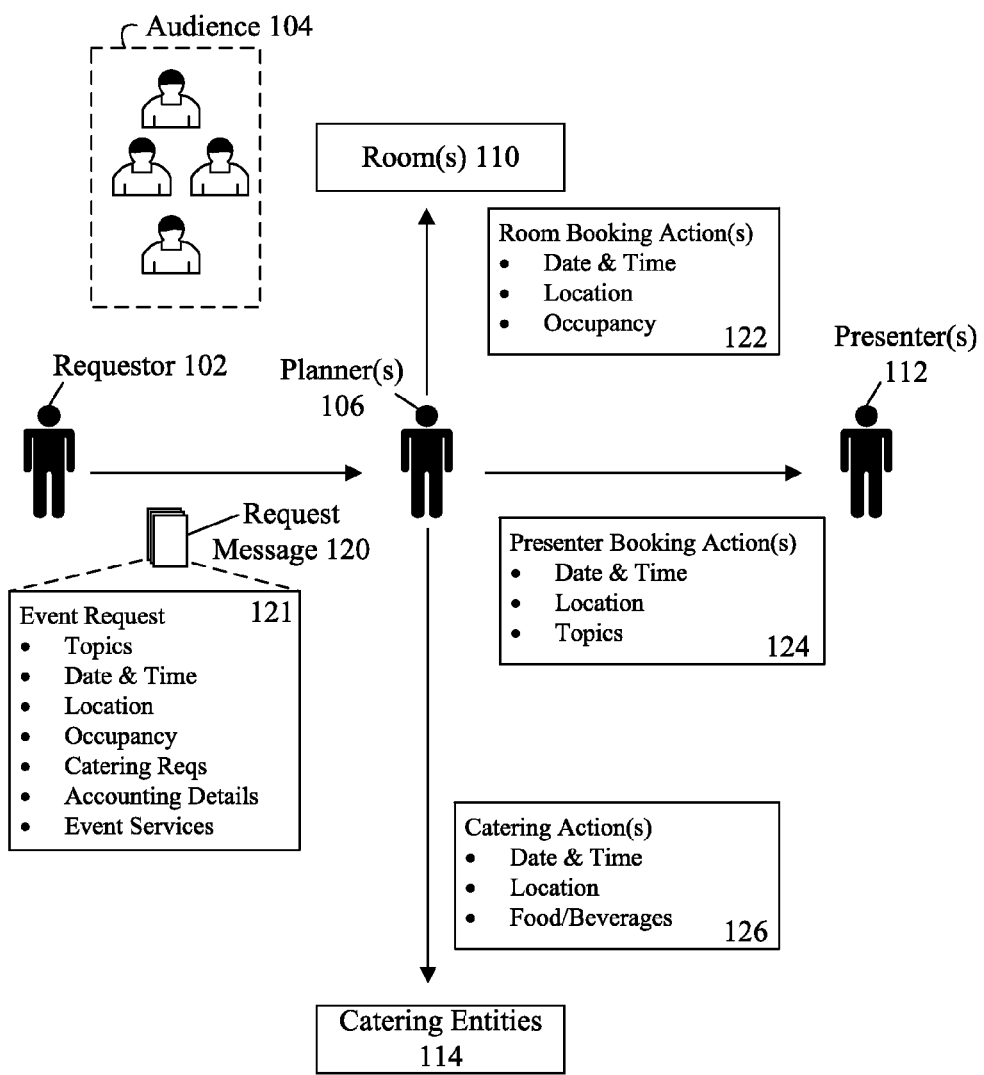
FIG. 1 (Prior Art) is a diagram illustrating a prior art for event planning in accordance with an embodiment of the inventive arrangements disclosed herein.

Prior art presentation event architectures 100 (an example of which is shown by FIG. 1) are denoted by a multitude of manual activities, which are inefficient and prone for errors. For example, the set of planners 106 has to determine the most appropriate set of presenters 112. Each of these presenters 112 must be available for the requested time, must possess knowledge on a specific topic, and must be willing to work within budgetary constraints established for the presentation event.

Additionally, in a conventional architecture 100, it is common for one or more presenters 112 to create material for their presentation from scratch. This adds uncertainty to the end quality of the presentations. For instance, the topics requested by the requestor 102 can be misinterpreted by the presenter 112, which can result in inappropriate presentations. In addition, a presentation of the presenter 112 can exceed allotted time frames, which can cause the presentation to exceed the agenda scheduled times.

Further, planners 106 of a presentation event often operate using processes that have not been formalized. In fact, many planners 106 consider knowledge of past presentations, contacts with service entities, and the like—that they gained over time—a leverage-able resource, which ensures job security. That is, in absence of a formalized approach for embodying knowledge of architecture 100, the experienced-based domain knowledge possessed by planners 106 has an elevated importance. While these experiences of planners 106 will always be beneficial, an automated, repeatable approach that formally captures domain expertise can result in superior results from use of ad hoc processes alone.

The present disclosure analyzed and recognized the problems of architecture 100 and in response provides a solution for automating the presentation event planning and logistics management process. In the solution, care can be taken to preserve and record presentation event assets (referred to as presentation artifacts), so that these artifacts can be leveraged to maximum effect for subsequent presentation events.

For example, digital artifacts (slide show presentations, multimedia clips, etc.) used in previous presentations can be stored within a repository along with relevant metadata. This metadata can indicate for each artifact: an original presenter, a date prepared, a set of topics covered by the material, a topic discussed, presentation duration, and/or other relevant information. Feedback regarding the success of the material, such as results of audience surveys, presenter feedback, and the like, can also be recorded and indexed against the presentation data. Thus, a corpus (e.g., indexed repository) of presentation artifacts can be built, which includes tools/data for evaluating a value of the individual artifacts in context of various presentation events.

In the solution, after data (e.g., the metadata) defining a presentation event is recorded, it can be used to automatically generate an agenda, which breaks down the event into a set of agenda items. Agenda items can each refer to a specific presentation and other relevant time designated segments of the event (catered breakfast, lunch, etc.). The agenda can specifically leverage existing presentation artifacts. That is, matches between metadata of existing presentation artifacts and requirements/constraints of the upcoming presentation event can occur, which helps define the upcoming presentation event and helps to automatically quantify details that were historically inferred by human planners. Thus, data-driven processes can be used to construct agenda items, such as a set of presentations and activities to be provided for the presentation event. Each presentation can be associated with a set of presenters, equipment, rooms, and the like. These specifics can be automatically determined by the event planning system. Additionally, a set of notifications, booking attempts, confirmations, adjustments, and the like can all be handled automatically (or can be at least facilitated by) the event planning system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
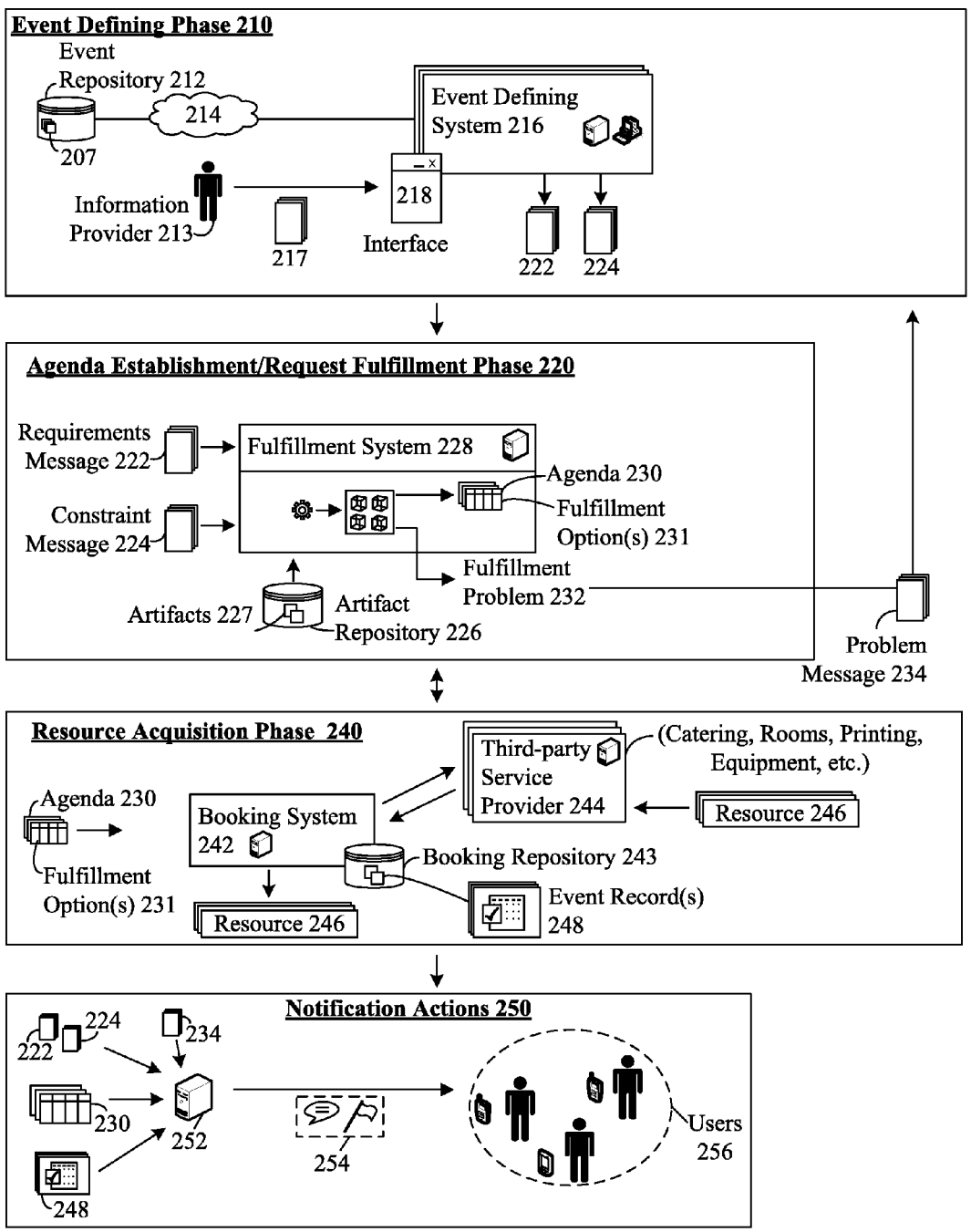
FIG. 2 is a diagram illustrating a flow for an automated setup of a presentation event in accordance with an embodiment of the inventive arrangements disclosed herein.

FIG. 2 is a diagram illustrating a flow 200 for an automated setup of a presentation event in accordance with an embodiment of the inventive arrangements disclosed herein. More specifically, flow 200 describes the setup, logistics management, and resource acquisition for a presentation event as a series of phases 210, 220 and 240. Notification actions 250 occur throughout the phases 210, 220, 240 to aid coordination among a set of users 256, such as event planners, service providers, presenters, resource managers, and audience members.

Each of the phases 210, 220, 240 represent a decomposition and further refinement of the presentation event. That is, at the end of the event defining phase 210 broad-brush requirements (at a relatively course level of granularity or abstraction) are established. That is, the event defining phase 210 does not define every specific activity conducted during the presentation event (i.e., no specific agenda has been constructed, nor have agenda items been defined). The event defining phase 210, however, can produce event constraints and requirements 222, 224. At the end of the request fulfillment and resource determination phase 220, a specific agenda 230 having a set of agenda items that define the presentation event and that fit the constraints and requirements 222, 224. At the end of phase 220, specific agenda items (and/or alternatives to these agenda items) are defined, but actual resources used to satisfy each agenda item are not established. In the resource acquisition phase 240, specific resources 246 needed to perform/conduct each of the activities are acquired or booked.

The phases 210, 220 and 240 are artificial constructs used to simplify the expression of the concepts expressed herein and are not intended to be a limitation of the scope of the disclosure. That is, it should be understood that the illustrated phases 210, 220, and 240 can have interdependencies, which can cause portions of the phases 210, 220, 240 to repeat and/or that can activities of the phases 210, 220, 240 to vary from the illustrated flow 200.

In the event defining phase 210 of flow 200, specifics (e.g., requirements and constraints) of a presentation event can be defined. One or more information providers 213 can enter particulars for a presentation event into a user interface 218 of an event defining system 216. Input (e.g., event request 217) from the providers 213 can define factors and/or criteria for the presentation event. This input can be supplemented and/or refined using information from event repository 212.

More specifically, the event defining system 216 can access event repository 212, such as over a network 214 connection. The event repository 212 can include historical data, preferences specific to different event requestors, and other information (collectively referred to as data 207), which can be used to infer proper values for gaps in defining the presentation event, where the gaps represent data not specifically input by any information provider 213. Upon being loaded with suitable information, the event defining system 216 can generate one or more requirements messages 222 or constraint messages 224.

Example elements (non-limiting, which are to be used for illustrative purposes and are not intended to be comprehensive) for the factors/criteria used in the event defining phase 210 are shown by a table (factors/criteria 260) of FIG. 2A. Some of these factors/criteria 260 can be expressed as a range, having an upper and lower threshold. Some can be defined as a target, with a variance (and a weighing equation for degrading value from the target in accordance with the equation). The constraints (different from requirements/constraints 265) can be hard (cannot be exceeded) or soft (can be exceeded, but when it happens a value equated with the presentation event is diminished). Similarly, the requirements can be hard or soft. In a weighing situation, an overall value can be computed for a presentation event (where requirements are associated with positive values, and constraints associated with negative values, for example). Different factors/criteria 260 can be weighed relative to each other based on their relative import for a specific presentation event.

The following are examples of criteria and/or factors for presentation events, which are not intended to be comprehensive: a field of study, one or more topics, and optional subtopics; a duration range for the presentation event; a data range for the presentation event; location/region preferences for the presentation event; a target audience for the event; food/drink options for the event; expected attendance numbers for the event; special activities to be conducted for the event (e.g., optional golf excursions, social hours, entertainment, etc.); a budget range; and a quality level (for accommodations, presenters, food, etc.), and the like. Different events will have different factors/criteria associated.

In the agenda establishment/request fulfillment phase 220, the event requirements 222 and constraints 224 can be processed to generate an agenda 230 for the presentation event. Presentation artifacts 227, which include existing presentations and other resources, that are stored in artifact repository 226, can be highly leveraged in this phase 220. For example, each of the artifacts 227 can have metadata that defines specifics for the artifacts, which can be matched to requirements 222, constraints 224, or to values derived from the same.

The agenda 230 can include a set of fulfillment options 231, which may be ranked or ordered relative to each other. For example, different combinations of presentations can be used to satisfy the topic requirements and time constraints for the same (as defined in the messages 222 and 224). A best-fit score can be associated with each of the fulfillment options 231.

In one embodiment, not all of the agenda items will be able to be filled using artifacts 227 (or portions thereof) of the artifact repository 226. For example, a top score generated for a particular agenda item will be under a minimal threshold value (or simply no matching item can be found. This situation can be referred to as a fulfillment problem 232, which can cause one or more problem messages 234 to be generated as a result. The problem message(s) 234 can be conveyed to a number of different people, to notify of a potential problem and/or to involve suitable people to take adjustment actions to resolve the fulfillment problem 232.

In one embodiment, for example, a problem message 234 can be sent to an information provider 213 or authorized administrator of the event defining phase 210. Upon receiving the message 234, the recipient can change criteria for the presentation event, which changes the requirements and/or constraints (of messages 222, 224). Thus, a new run of the fulfillment system 228 (using the updated requirements 222 or constraints 224) can correct the fulfillment problem 232. In one embodiment, the fulfillment system 228 can run additional "threshold breaking" options for each fulfillment problem 232, which permits suggestions to be included in problem messages 234, which proposes minimal changes to the requirements (represented by message 222) and/or constraints (message 224), which could permit the system 228 to generate a fulfillment option 231 instead of a fulfillment problem 232.

In another embodiment, messages (e.g., problem messages 234) can suggest that new artifacts 227 be created, when existing artifacts 227 are unable to satisfy one or more agenda sub-items. These new artifacts 227 can be generated by a presenter, can be contracted for by a presentation creator (who is not the presenter), and/or can be purchased from different existing repositories of artifacts. In one embodiment, a cost estimate (and value estimate) can be assigned to the various options for fulfillment problems 232, which can be used to determine a most advantageous solution. For example, future value (and other quantifiable parameters) can be considered for generating a new re-usable artifact 227, which satisfies gaps in the artifact repository 226, as opposed to creating an artifact tightly tailored for a specific need.

Sample (non-comprehensive) resources and constraints (expressed as messages 222 and 224) that drive phase 220 are shown in a table (for requirements/constraints 265) of FIG. 2A. Requirements can represent positive attributes needed for a resource, while constraints represent negative attributes. Like the factors and criteria, the requirements and constraints can be hard or soft, depending on implementation specifics. Weights can be optionally used to bias outcomes, where different requirements/constraints 265 can have more significance than others. Requirements and constraints 265 can be established for rooms (e.g., size, quality, acoustics, location, etc.), presentations (e.g., media type, duration, topic covered, quality, currency, etc.), presenters (e.g., knowledge of a topic, notoriety level, charisma level, etc.), staff (quantity of assistances needed, set-up crew requirements, clean-up crew requirements, etc.), equipment (chairs, tables, audio/visual equipment, etc.), proximate attractions (desirable local entertainment, upper and lower limits depending on the event, etc.), and the like.

Sample tables 270 and 275 of FIG. 2A express some sample (Sample A and Sample B) artifacts that may be stored in the artifact repository 226. Presentations are focused upon in Sample A and B, but it should be realized that the repository 226 can store any of a variety of different relevant artifacts 227 for a presentation event. Table 270 shows a set of presenters organized by topic, subtopic, presentation file name, slides, duration, and original presenter. Table 275 shows a file name, a duration, a duration variance, a topic, a presentation type, and a target audience quantity for each record. The two samples (Sample A and B) illustrate that different metadata values can be stored and that no one set of metadata is absolutely required. In fact, it is expected that different types of presentations and presentation events have different elements of greater/lesser import than others. Regardless of the values used for the artifacts 227, these values should map to the requirements/constraints 265 in a deterministic fashion.

In the resource acquisition phase 240, once an agenda 230 and fulfillment options 231 (each associated with an agenda item) have been created, a booking system 242 can acquire resources 246 needed. The resources 246 can include local resources as well as resources provided by one or more third party service provider 244. Examples of third party service providers 244 include catering, services, room reservations, printing services, equipment rental, acquisition services, and the like. The booking system 242 can send requests, contracts, and other necessary communications to the third party service providers 244 and/or to reserve locally available resource. The booking system 242 can record booked (and un-booked) specifics for the presentation event as event records 248 of booking repository 243.

Resources 246 can include artifacts 227 of the artifact repository 226 can include people (e.g., presenters), rooms, chairs, audio-visual equipment, and the like. Basically, everything necessary for the presentation event (down to the lowest of levels) can be booked via booking system 242. This booking can occur in an automated manner (semi-automated, or manually assisted manner in other embodiments), where fulfillment options 231 with the highest value scores are attempted first. When resources 246 are unavailable for a given fulfillment option, a next highest scored option can be attempted by the booking system 242, and so forth. Additionally, the booking system 242 can automatically make suitable adjustments, when a resource becomes unavailable before the event. For example, a presenter (one type of resource) can cancel before the presentation event, where the booking system 242 can find and book a substitute presenter.

In one embodiment, results from the booking system 242 (or lack thereof) can require significant adjustments to the presentation event. For example, when no resources 246 are able to be booked for a given fulfillment option 231, an alternative fulfillment option 231 can be booked. Fulfillment options 231 that are booked, can be referred to as agenda items (e.g., agenda items are fulfillment options 231 that are satisfied and recorded in booking repository 243 within event records 248). When resources 246 are not able to be booked for any of the fulfillment options 231 established by fulfillment system 228, then a fulfillment problem 232 can be created as a result of a failure by booking system 242. This can trigger a resolution actions (such as sending problem message(s) 234), as previously discussed. Thus, activities occurring in one phase 210, 220, or 240 can dynamically cause changes in one or more other phases 210, 220, or 240.

As previously noted, notification actions 250 can occur throughout the flow 200. For example, when event records 248 are established in the booking repository 243, the notification server 252 can convey messages 254 to a set of affected users 256. Instead of messages 254 being conveyed, records of updates can be exchanged between a set of different databases, which are accessible by one or more of the users 256. The notification server 252 can also be used to convey suitable messages 254 (or data) to third party providers 244, resources 246 (human or computing system resources), administrators, and the like. Messages 254 can be triggered by activities occurring within any of the phases 210, 220, 240. Messages 254 sent by the notification server 252 can include requirements messages 222, constraint messages 224, problem messages 234, agenda messages 230, and the like. The message 254 need not be identical in nature, but can be derived from data of these messages 222, 224, 234, etc. in one contemplated embodiment. Further, messages 254 from the notification server 252 can be customized to a recipient (one of users 256) and can have its format, language, and/or modality changed automatically.

The notification server 252 can represent any of a variety of different communication servers, such as an email server, an instant messaging server, a chat server, a fax server, a telephony server, and the like. In one embodiment, optical character recognition (OCR), speech recognition, automatic speech generation, and other communication technologies can be utilized by (or in conjunction with) the notification server 252.

Although different systems are shown (one per phase 210, 220, 240) for flow 200, actual implementations of system may not be functionally demarcated in the manner shown. For example, functionality of the event defining system 216, the fulfillment system 228, the booking system 242, and/or the notification server 252 can be integrated into a single system or a set of N systems, where N is a natural number. Each system 216, 228, 242 can also be implemented using one or more servers, as can systems used by any of the third party service providers 244.

Each client device or server of flow 200 can comprise a set of one or more hardware devices, each of which optionally containing software (e.g., an operating system, BIOS, software/firmware computer program products, etc.) that the hardware is able to execute to perform computing operations. The hardware can include one or more central processing unit, a volatile memory, and a non-volatile memory, and a network adaptor (for connecting the hardware to a network) interconnected via a bus. Each of the device and server can be implemented as a standalone machine or as a set of two or more machines operating in a distributed computing space as a single computing device. Further, a software application, as detailed herein, can be an application comprising multiple different components, each of which may be executed upon different servers. For example, software application can be a SOA based application comprising one or more services.

A network (which can include network 214) connecting the devices and/or servers in flow 200 can include any hardware/software/and firmware necessary to convey data encoded within carrier waves. Data can be contained within analog or digital signals and conveyed though data or voice channels. The network can include local components and data pathways necessary for communications to be exchanged among computing device components and between integrated device components and peripheral devices. The network can also include network equipment, such as routers, data lines, hubs, and intermediary servers which together form a data network, such as the Internet. The network can also include circuit-based communication components and mobile communication components, such as telephony switches, modems, cellular communication towers, and the like. The network can include line based and/or wireless communication pathways.

As used herein, presented data stores (including event repository 212, artifact repository 226, and booking repository 243, as well as storage mediums used by devices and servers of the flow 200) can be a physical or virtual storage space configured to store digital information. Data stores can be physically implemented within any type of hardware including, but not limited to, a magnetic disk, an optical disk, a semiconductor memory, a digitally encoded plastic memory, a holographic memory, or any other recording medium. Data stores can be a stand-alone storage unit as well as a storage unit formed from a plurality of physical devices. Additionally, information can be stored within data stores in a variety of manners. For example, information can be stored within a database structure or can be stored within one or more files of a file storage system, where each file may or may not be indexed for information searching purposes. Further, data stores can utilize one or more encryption mechanisms to protect stored information from unauthorized access.

Figure 3:
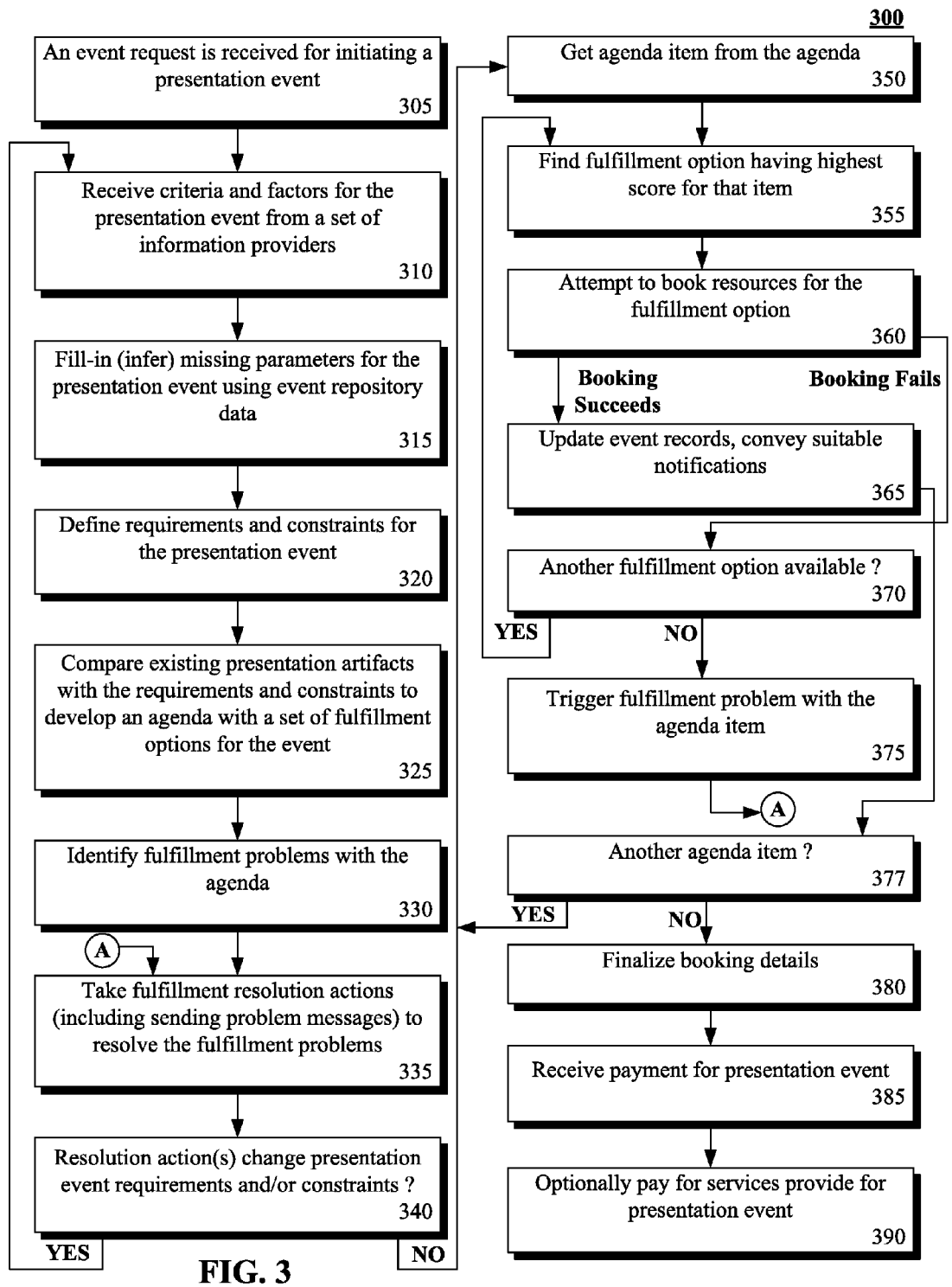
FIG. 3 is a diagram illustrating a method for automating logistics, setup, and management actions for presentation events in accordance with an embodiment of the inventive arrangements disclosed herein.

FIG. 3 is a diagram illustrating a method 300 for automating logistics, setup, and management actions for presentation events in accordance with an embodiment of the inventive arrangements disclosed herein.

The method can begin in step 305, wherein an event request for initiating a presentation event can be received.

The event request can be manually and/or automatically conveyed to a computing device that is used to define the presentation event. In step 310, criteria and factors for the presentation event can be received from a set of information providers. In step 315, missing parameters needed for a presentation event can be filled-in or inferred using event repository data.

In step 320, a set of requirements and constraints for the presentation event can be defined. These requirements and constraints can be compared with existing presentation artifacts to develop an agenda, as shown by step 325. The agenda can be one having a set of fulfillment options, each associated with a time slot of the agenda. Multiple fulfillment options can exist for each time slot, where they are ranked by a computed score. Existing presentation artifacts can be associated with at least a portion of the time slots. In one embodiment, portions of the existing artifacts (which may need supplements added to them) can be used. Additionally, multiple ones of the presentation artifacts can be combined for a single presentation (or time slot).

In step 330, zero or more fulfillment problems can be identified with the agenda. Each fulfillment problem represents a time slot, objective, goal, or activity that cannot be satisfied by an existing artifact. For each identified fulfillment problem, a set of one or more resolution actions can be taken to resolve the corresponding problem, as shown by step 335. Numerous different resolution actions can be taken, such as a creation of new presentation artifacts, changing a set of agenda items (to less desirable ones) due to an existence of presentation artifacts that more closely satisfy the requirements of the presentation events. One or more of the resolution actions may change presentation event requirements and/or constraints. When so, the method can progress from step 340 to step 310, where new criteria or factors can be established for presentation event. These changes can change the requirements/constraints, which in turn may change the agenda.

If the agenda remains unchanged, an agenda item (e.g., the first one) can be examined, as shown by step 350. In step 355, a fulfillment option having the highest score for that agenda item can be found. In step 360, an attempt can be made to book resources for the fulfillment option. When booking succeeds, event records can be updated to express the booking details, as shown by step 365. A successfully booked fulfillment option can satisfy the corresponding agenda item. Suitable notifications can then be conveyed to affected parties. Then, the method can progress to step 377.

When booking fails, another fulfillment option (having a lower score) may or may not be available. If available, the method can progress from step 370 back to step 355, where the next highest fulfillment option can be examined. When no fulfillment option exists, a fulfillment problem with satisfying the agenda item can be triggered, as shown by step 375. This fulfillment problem causes a resolution action to be taken, shown by progressing from step 375 to step 335.

In step 377, a check to see if another (unprocessed) agenda item exists. If so, the method progresses back to step 350, where that agenda item is examined. When no more agenda items exist, the method progresses to step 380, where booking details can be finalized. For example, finalization can include booking resources such as event presenters, catering, and rooms. In step 385, payment for the presentation event can be received. For example, attendees of the conference may have to pay for a right to attend. In another embodiment, advertisers can sponsor the presentation event, which have to make payments for the event. In step 390, a provider of the presentation event can pay for services provided for the presentation event. Payments received and paid can occur automatically using the event planning system.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following claims are to be interpreted in light of the specification. As such, terms within the claims are to be explicitly interpreted as (and to be constrained in scope to) being directed to statutory subject matter falling within the boundaries of 35 USC 101, which are limitations that the following claims are constrained to. Any interpretations of the claims exceeding these intended boundaries are explicitly interpretations extending past the defined scope of the claims in light of this specification as defined herein. That is, any embodiments outside the scope of 35 USC 101 are expressly not included within scope of the claims herein.

What is claimed is:

1. A method for handling presentation events comprising:
   querying, by a computing device, an artifact repository, comprised of computer readable storage media, for a plurality of different pre-existing presentation artifacts, stored in the artifact repository, based on requirements and constraints of a presentation event to produce a query result, wherein said query result comprises at least a set of presentation artifacts suitable for satisfying at least a portion of the requirements and constraints, wherein each of the pre-existing artifacts comprises artifact specific metadata indicating at least an artifact topic and duration, and wherein the querying matches the artifact specific metadata against the requirements and constraints to produce the query result; and
   automatically constructing, by a computing device, an agenda comprising a plurality of different agenda items utilizing the query result, wherein each of the different agenda items occupies a time slot of the presentation event, wherein at least a portion of the different agenda items are for presentations to be given by a presenter, wherein at least a portion of the pre-existing artifacts identified in the query result comprise media to be presented to an audience by a presenter during a course of one of the presentations, wherein creation of agenda items is a non-manual effort automatically determined by the computing device in a data driven manner given the requirements, the constraints, and the pre-existing presentation artifacts of the artifact repository.

2. The method of claim 1, further comprising:
automatically booking, by a computing device, resources for the different agenda items, wherein the resources comprise presenters associated with the presentations and comprise equipment and rooms needed for the presentations, wherein identification of needed resources and the booking of these resources is a non-manual effort automatically performed by a computing device.

3. The method of claim 2, wherein the booking of resources further comprises:
booking, by a computing device, at least one service for the presentation event, wherein the at least one service comprises a catering service for food and drink for the presentation event, wherein the booking of the at least one service is a non-manual effort performed by a computing device in accordance with requirements and times of specific ones of the agenda items.

4. The method of claim 2, further comprising:
automatically remunerating, by a computing device, resource owners for the booked resources without requiring manual effort by human agents for the remunerating.

5. The method of claim 1, further comprising:
receiving factors and criteria, by a computing device, for the presentation event, where the factors and criteria establish high-level requirements for a presentation event, which includes at least one topic, at least one date range, at least one duration range, and at least a target audience for the presentation event; and
automatically converting the factors and criteria to a set of requirements and constraints for the presentation event, where the requirements and constraints comprise at least a plurality of inferred elements not input directly by a human information provider.

6. The method of claim 1, further comprising:
for at least a portion of the different agenda items, generating, by a computing device, a plurality of different fulfillment options, each able to satisfy the agenda item;
ranking the fulfillment options relative to each other; and
attempting, by a computing device, to acquire resources needed for each of the fulfillment options for the agenda item in accordance with an order of the ranking until resources are available for the fulfillment option at which point that fulfillment option is used for the agenda item.

7. The method of claim 2, wherein the resources used in the booking comprise at least one of an event presenter, catering service, and an event service.

8. A system comprising:
an artifact repository including non-transitory computer readable storage media for storing a plurality of different pre-existing presentation artifacts, wherein each of the pre-existing artifacts comprises artifact specific metadata indicating at least an artifact topic and duration, wherein presentation artifacts comprise presentation files to be presented to an audience by a set of one or more presenters;
a fulfillment system implemented in a computing environment utilizing software and hardware and configured to query the artifact repository for a set of the different pre-existing presentation artifacts based on requirements and constraints of a presentation event to produce a query result, wherein said fulfillment system is further configured to constructing an agenda comprising a plurality of different agenda items utilizing the query result, wherein each of the different agenda items occupies a time slot of the presentation event, wherein at least a portion of the different agenda items are for presentations to be given by a presenter, wherein creation of agenda items is a non-manual effort automatically determined by a computing device in a data driven manner given the requirements, the constraints, and the pre-existing presentation artifacts of the artifact repository; and
a booking system implemented in a computing environment utilizing software and hardware and for booking resources for the different agenda items, wherein the resources comprise presenters associated with the presentations and comprise equipment and rooms needed for the presentations, wherein the booking of resources occurs, wherein identification of needed resources and the booking of these resources is a non-manual effort automatically performed by a computing device.

9. The system of claim 8, wherein said booking system is further for booking at least one service for the presentation event, wherein the at least one service comprises a catering service for food and drink for the presentation event, wherein the booking of the at least one service is a non-manual effort performed by a computing device in accordance with requirements and times of specific ones of the agenda items.

10. The system of claim 8, further comprising an event defining system implemented in a computing environment utilizing software and hardware and for receiving factors and criteria for the presentation event, where the factors and criteria establish high-level requirements for the presentation event, which includes at least one topic, at least one date range, at least one duration range, and at least a target audience for the presentation event, and wherein the event defining system is for automatically converting the factors and criteria to a set of requirements and constraints for the presentation event, where the requirements and constraints comprise at least a plurality of inferred elements not input directly by a human information provider.

11. A method comprising:
identifying, by a computing device, a presentation event having defined requirements and constraints, wherein the requirements and constraints designate a date range, a duration ranges, a set of topics, a location, a budget range, and a target audience for the presentation event;
evaluating, by a computing device, the requirements and constraints against a metadata of artifacts stored in an artifact repository, wherein said artifacts comprise at least a set of presentation files, wherein the metadata comprises at least a topic, a duration, of the presentation files;
constructing, by a computing device, an agenda comprising a set of agenda items for the presentation event, wherein at least a portion of the agenda items comprise artifacts including the presentation files, which were selected based on mapping topic of the presentation artifact against the topics of the requirements and constraints, wherein a duration of the agenda items is based at least in part upon the duration of the metadata of the associated artifacts;
booking, by a computing device, resources for the agenda items; and
establishing event records, by a computing device, associated with the event request based on the evaluating, wherein the event record is persisted within a booking system, wherein the event record comprises at least one of an event identifier, an event data, and an event service identifier.

12. The method of claim 11, further comprising:
automatically calculating, by a computing device, a duration value associated with the presentation artifacts, wherein the duration value is determined based on an estimation algorithm, wherein the resources used in the booking comprise at least one of an event presenter, catering service, and an event service; and
determining, by a computing device, a cumulative duration associated with a plurality of presentation artifacts, ensuring the cumulative duration is under a corresponding portion of the duration established for the presentation event.

13. The method of claim 11, further comprising:
for at least a portion of the different agenda items, generating, by a computing device, a plurality of different fulfillment options, each able to satisfy the agenda item;
ranking the fulfillment options, by a computing device, relative to each other; and
attempting to acquire, by a computing device, resources needed for each of the fulfillment options for the agenda item in accordance with an order of the ranking until resources are available for the fulfillment option at which point that fulfillment option is used for the agenda item.

14. The method of claim 11, wherein one of the artifacts is a presentation file, wherein the resource that are booked for that presentation file comprises an event presenter, said method further comprising:
selecting, by a computing device, an event presenter satisfying at least one criteria, wherein the at least one criteria is recorded in metadata of the presentation file and an availability recorded in the event presenter electronic calendar, wherein the event presenter is a human agent associated with the presentation event; and
conveying, by a computing device, a notification to a computing device associated with the event presenter.

15. The method of claim 14, further comprising:
conveying, by a computing device, a content request notification to the event presenter, wherein the content request notification provides the event presenter with a copy of the presentation file and with a time and place of the presentation event.

16. A computer program product comprising a computer readable storage medium having computer usable program code embodied therewith, the computer usable program code comprising:
computer usable program code stored in a non-transitory storage medium, if said computer usable program code is executed by a processor it is operable to query an artifact repository for a plurality of different pre-existing presentation artifacts based on requirements and constraints of a presentation event to produce a query result, wherein said query result comprises at least a set of presentation artifacts suitable for satisfying at least a portion of the requirements and constraints, wherein each of the pre-existing artifacts comprises artifact specific metadata indicating at least an artifact topic and duration, and wherein the querying matches the artifact specific metadata against the requirements and constraints to produce the query result; and
computer usable program code stored in a non-transitory storage medium, if said computer usable program code is executed by a processor it is operable to automatically construct an agenda comprising a plurality of different agenda items utilizing the query result, wherein each of the different agenda items occupies a time slot of the presentation event, wherein at least a portion of the different agenda items are for presentations to be given by a presenter, wherein at least a portion of the pre-existing artifacts identified in the query result comprise media to be presented to an audience by a presenter during a course of one of the presentations, wherein creation of agenda items is a non-manual effort automatically determined by a computing device in a data driven manner given the requirements, the constraints, and the pre-existing presentation artifacts of the artifact repository.

17. The computer program product of claim 16, further comprising:
computer usable program code stored in a non-transitory storage medium, if said computer usable program code is executed by a processor it is operable to automatically book resources for the different agenda items, wherein the resources comprise presenters associated with the presentations and comprise equipment and rooms needed for the presentations, wherein identification of needed resources and the booking of these resources is a non-manual effort automatically performed by a computing device.

18. The computer program product of claim 17, wherein the booking of resources further comprises:
computer usable program code stored in a non-transitory storage medium, if said computer usable program code is executed by a processor it is operable to book at least one service for the presentation event, wherein the at least one service comprises a catering service for food and drink for the presentation event, wherein the booking of the at least one service is a non-manual effort performed by a computing device in accordance with requirements and times of specific ones of the agenda items.

19. The computer program product of claim 17, further comprising:
computer usable program code stored in a non-transitory storage medium, if said computer usable program code is executed by a processor it is operable to automatically remunerate resource owners for the booked resources without requiring manual effort by human agents for the remunerating.

20. The computer program product of claim 16, further comprising:
computer usable program code stored in a non-transitory storage medium, if said computer usable program code is executed by a processor it is operable to receive factors and criteria for the presentation event, where the factors and criteria establish high-level requirements for a presentation event, which includes at least one topic, at least one date range, at least one duration range, and at least a target audience for the presentation event; and
computer usable program code stored in a non-transitory storage medium, if said computer usable program code is executed by a processor it is operable to automatically convert the factors and criteria to a set of requirements and constraints for the presentation event, where the requirements and constraints comprise at least a plurality of inferred elements not input directly by a human information provider.

21. The computer program product of claim 16, further comprising:
    computer usable program code stored in a non-transitory storage medium, if said computer usable program code is executed by a processor it is operable to, for at least a portion of the different agenda items, generate a plurality of different fulfillment options, each able to satisfy the agenda item;
    computer usable program code stored in a non-transitory storage medium, if said computer usable program code is executed by a processor it is operable to rank the fulfillment options relative to each other; and
    computer usable program code stored in a non-transitory storage medium, if said computer usable program code is executed by a processor it is operable to attempt to acquire resources needed for each of the fulfillment options for the agenda item in accordance with an order of the ranking until resources are available for the fulfillment option at which point that fulfillment option is used for the agenda item.

22. The computer program product of claim 17, wherein the resources used in the booking comprise at least one of an event presenter, catering service, and an event service.

23. The method of claim 1, wherein the presentation event has the defined requirements and constraints, wherein the requirements and constraints designate a date range, a duration ranges, a set of topics, a location, a budget range, and a target audience for the presentation event, said method further comprising:
    evaluating, by a computing device, the requirements and constraints against a metadata of the presentation artifacts stored in an artifact repository, wherein said presentation artifacts comprise at least a set of presentation files, wherein the metadata comprises at least a topic, a duration, of the presentation files, wherein at least a portion of the agenda items comprise artifacts including the presentation files, which were selected based on mapping topic of one of the presentation artifacts against the topics of the requirements and constraints, wherein a duration of the agenda items is based at least in part upon the duration of the metadata of the associated artifacts;
    booking, by a computing device, resources for the agenda items; and
    establishing, by a computing device, event records associated with the event request based on the evaluating, wherein the event record is persisted within a booking system, wherein the event record comprises at least one of an event identifier, an event data, and an event service identifier.

24. The method of claim 1, further comprising:
    for at least a portion of the different agenda items, generating a plurality of different fulfillment options, each able to satisfy the agenda item;
    ranking, by a computing device, the fulfillment options relative to each other; and
    attempting, by a computing device, to acquire resources needed for each of the fulfillment options for the agenda item in accordance with an order of the ranking until resources are available for the fulfillment option at which point that fulfillment option is used for the agenda item.

25. The method of claim 1, wherein one of the artifacts is a presentation file, wherein the resource that are booked for that presentation file comprises an event presenter, said method further comprising:
    selecting, by a computing device, an event presenter satisfying at least one criteria, wherein the at least one criteria is recorded in metadata of the presentation file and an availability recorded in the event presenter electronic calendar, wherein the event presenter is a human agent associated with the presentation event; and
    conveying, by a computing device, a notification to a computing device associated with the event presenter.

* * * * *